United States Patent
Handy et al.

(10) Patent No.: US 9,644,470 B2
(45) Date of Patent: May 9, 2017

(54) DOWNHOLE CAMERA

(71) Applicant: Baker Hughes Incorporated, Houston, TX (US)

(72) Inventors: William Brooks Handy, Spring, TX (US); Jeffery Kitzman, Conroe, TX (US); Christopher Elliott, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 467 days.

(21) Appl. No.: 14/299,348

(22) Filed: Jun. 9, 2014

(65) Prior Publication Data

US 2015/0354339 A1    Dec. 10, 2015

(51) Int. Cl.
| | |
|---|---|
| E21B 47/00 | (2012.01) |
| E21B 47/12 | (2012.01) |
| E21B 23/06 | (2006.01) |
| G03B 37/00 | (2006.01) |

(52) U.S. Cl.
CPC .......... *E21B 47/0002* (2013.01); *E21B 23/06* (2013.01); *E21B 47/124* (2013.01); *G03B 37/005* (2013.01)

(58) Field of Classification Search
CPC .... E21B 47/0002; E21B 23/06; E21B 47/124; G03B 37/005
See application file for complete search history.

(56) References Cited

U.S. PATENT DOCUMENTS

| | | | | |
|---|---|---|---|---|
| 2,940,370 A | * | 6/1960 | Yandell | G01V 8/02 |
| | | | | 166/179 |
| 6,115,061 A | * | 9/2000 | Lieberman | E21B 47/0002 |
| | | | | 175/49 |
| 6,431,270 B1 | * | 8/2002 | Angle | E21B 4/18 |
| | | | | 166/50 |
| 6,697,102 B1 | * | 2/2004 | Olsson | E21B 47/0002 |
| | | | | 324/323 |
| 8,054,459 B2 | * | 11/2011 | Lindner | G01N 21/94 |
| | | | | 356/241.1 |
| 2004/0177681 A1 | * | 9/2004 | Harthorn | E21B 17/01 |
| | | | | 73/152.57 |
| 2006/0137441 A1 | * | 6/2006 | Harthorn | E21B 17/01 |
| | | | | 73/152.57 |
| 2009/0218097 A1 | * | 9/2009 | Cook | E21B 37/00 |
| | | | | 166/250.17 |
| 2010/0283788 A1 | * | 11/2010 | Rothnemer | E21B 47/0002 |
| | | | | 345/473 |
| 2011/0138903 A1 | * | 6/2011 | Large | E21B 17/1021 |
| | | | | 73/152.17 |
| 2014/0092235 A1 | | 4/2014 | Firmin et al. | |
| 2014/0278111 A1 | * | 9/2014 | Gerrie | E21B 47/0002 |
| | | | | 702/8 |

* cited by examiner

*Primary Examiner* — Blake Michener
(74) *Attorney, Agent, or Firm* — Shawn Hunter

(57) ABSTRACT

A camera apparatus that is at least partially incorporated within a downhole tool to be disposed to a subterranean location by a running arrangement. The camera apparatus includes a camera sensor for capturing one or more visual images of a subterranean location and a memory storage operably associated with camera sensor, the camera sensor providing one or more visual images to the storage memory.

16 Claims, 5 Drawing Sheets

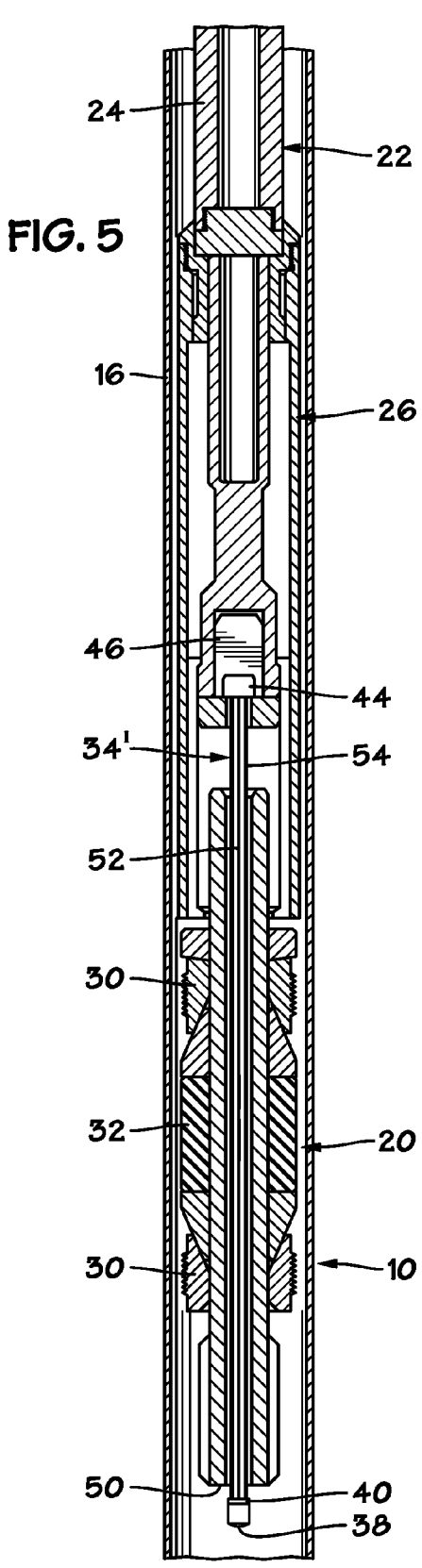
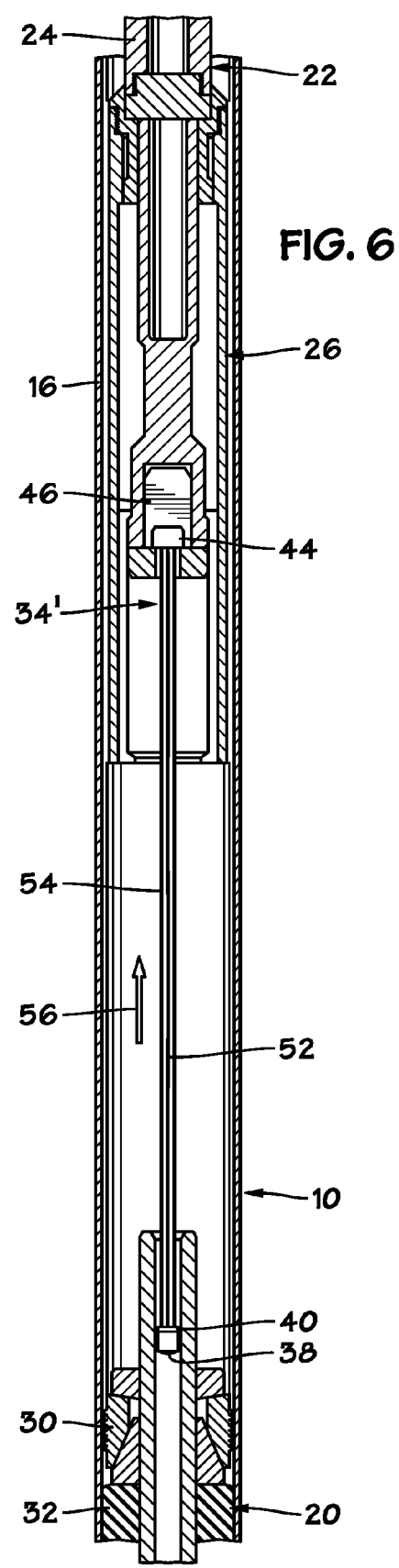

DOWNHOLE CAMERA

BACKGROUND OF THE INVENTION

1. Field of the Invention

The invention relates generally to the use of camera equipment with downhole equipment.

2. Description of the Related Art

Wellbores are often lined with metallic casing, which may develop ruptures, flaws or discontinuities or have other issues that can create problems working within the wellbore.

SUMMARY OF THE INVENTION

The invention provides camera apparatuses that can be used with a variety of downhole tools in order to help identify flaws in the wellbore casing, blockages, or other issues. In particular embodiments, a camera apparatus is incorporated into a tool that is run into a wellbore using a running arrangement for capturing one or more visual images of a subterranean location, such as the wellbore. In certain embodiments, a camera apparatus, or portions thereof, is disposed upon or proximate the distal end of a tool that is run into a wellbore so that visual images of the wellbore can be captured. In preferred embodiments, the camera is adapted to record video images.

In more particular described embodiments, an emplaceble wellbore device, such as a plug, lock, anchor or other tool and associated running arrangement have a camera device incorporated therein. In described embodiments, a photographic camera sensor is incorporated into the wellbore device, while memory for the camera is incorporated into the running arrangement. In a particular described embodiment, a camera arrangement in accordance with the present invention is incorporated into a frac plug and associated running arrangement.

In particular embodiments, a power source for the camera and storage memory is preferably incorporated into the running arrangement. A severable communications conduit interconnects the camera device with the memory and/or the power source. The communications conduit permits power to be transmitted to the camera from the power source. It also allows photographic images obtained by the camera to be transmitted to the memory for storage. The communications conduit is preferably severed when the running arrangement is detached from the emplaceable wellbore device.

According to certain embodiments, the camera is associated with one or more light sources, such as light-emitting diode (LED) lights which provide illumination of the subterranean surroundings for the camera.

In operation, the running arrangement and affixed emplaceable wellbore device are run into a wellbore to a desired depth or location within the wellbore. During running in, the camera is activated to obtain one or more visual images of the wellbore. When the wellbore device reaches the desired depth or location, the emplaceable device is set within the wellbore. The running arrangement is then detached from the emplaceable device and retrieved from the wellbore. The severable communications conduit is severed, allowing the memory and power source to be removed from the wellbore along with the running arrangement. At surface, the memory is retrieved from the running arrangement and images are obtained therefrom.

An alternative camera apparatus is described wherein the communications conduit is not severed during removal of the running arrangement. As a result, the camera lens and sensor are removed along with the storage memory and power source.

According to another aspect of the current invention, visual images captured by the camera sensor are transmitted to the surface via a transmission conduit. The transmission conduit can be in the form of an optic fiber, data cable or electric cable. Transmission to the surface can occur in addition to or instead of storing the visual images within the storage memory.

BRIEF DESCRIPTION OF THE DRAWINGS

The advantages and further aspects of the invention will be readily appreciated by those of ordinary skill in the art as the same becomes better understood by reference to the following detailed description when considered in conjunction with the accompanying drawings in which like reference characters designate like or similar elements throughout the several figures of the drawing and wherein:

FIG. 5 is a side, cross-sectional view of an alternative arrangement for a downhole tool having a camera apparatus associated therewith.

FIG. 6 is a side, cross-sectional view of the arrangement shown in FIG. 5, now with the downhole tool having been set within a wellbore and the setting tool and camera apparatus being removed.

DETAILED DESCRIPTION OF THE PREFERRED EMBODIMENTS

Figure 1:
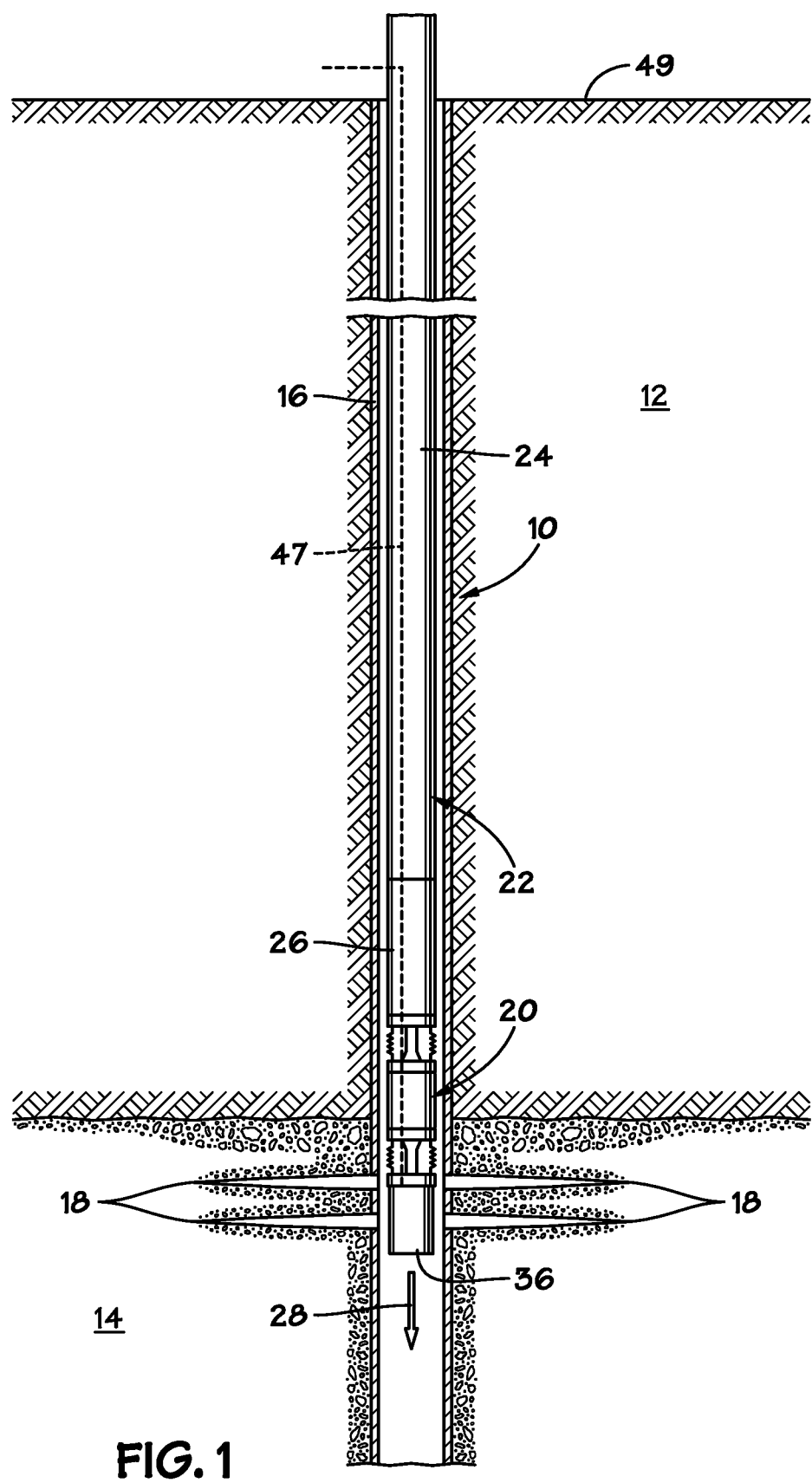
FIG. 1 is a side, cross-sectional view of an exemplary wellbore into which a plug is being disposed to be set.

FIG. 1 illustrates an exemplary wellbore 10 that has been drilled through the earth 12 down to a hydrocarbon-bearing formation 14 at which it is desired to perform a fracturing operation. Metallic casing 16 lines the wellbore 10, having been cemented into place in a manner known in the art. Perforations 18 have been created through the casing 16 into the formation 14.

An exemplary tool, in the form of an emplaceable frac plug 20 is shown being disposed into the wellbore 10 by a running arrangement 22. A suitable frac plug for use as the frac plug 20 is a Quik Drill composite frac plug which is available commercially from Baker Hughes Incorporated of Houston, Tex. The running arrangement 22 includes a running string 24 and a setting tool 26. Running string 24 can be coiled tubing, slickline, pipe or, in appropriate cases, wireline. Other suitable running strings can also be used. In FIG. 1, the frac plug 20 and setting tool 26 are being disposed into the wellbore 10 in the direction of the arrow 28.

Figure 2:
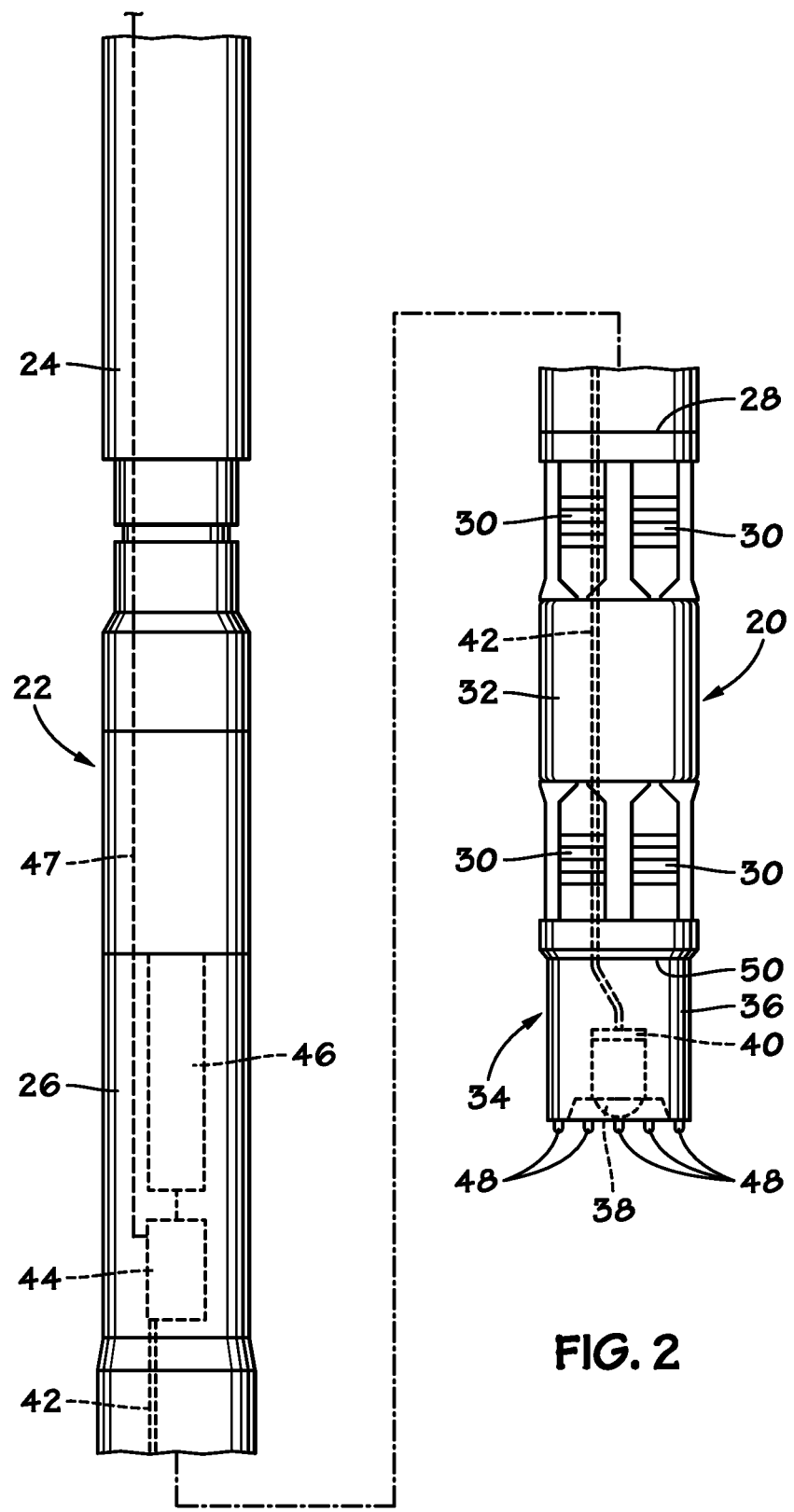
FIG. 2 is a side, cross-sectional view of an exemplary wellbore tool having a camera and associated components

FIG. 2 illustrates the frac plug 20 and portions of the running arrangement 22 in greater detail and which incorporates an exemplary camera apparatus in accordance with the present invention. Setting tool 26 can be actuated from the surface to set the frac plug 20 within the wellbore 10 at the desired depth or location within the wellbore 10. The setting tool 26 is releasably affixed to the frac plug 20 at connection 28 shown in FIG. 2 and is typically designed to release the frac plug 20 from the setting tool 26 upon setting of the frac plug 20 within the wellbore 10. Suitable setting tools for use as the setting tool 26 are the Model M4 and M5 wireline pressure setting assemblies which are available commercially from Baker Hughes Incorporated of Houston, Tex. The setting tools use sliding sleeves to exert axial forces upon portions of the frac plug 20 that will result in slips being set and a packer element being radially expanded into sealing engagement with the surrounding wellbore 10. Frac plug 20 includes radially expandable slip elements 30 and an elastomeric packer element 32.

FIG. 2 also illustrates an exemplary camera apparatus, generally indicated at 34, which is incorporated into the frac plug 20 and the running arrangement 22. The exemplary camera apparatus 34 includes a camera housing 36 which is affixed to the lower end of the frac plug 20. Camera housing 36 encloses camera lens 38 and electronic sensor, or other light-sensitive medium 40 for capturing one or more visual images. The camera lens 38 functions to focus one or more visual images upon the sensor 40. Preferably, the lens 38 is adjustable in focus, as is known in the art.

Severable electronic communications cable 42 extends from the sensor 40 to a storage memory 44 which is disposed within the setting tool 26. In addition, the cable 42 interconnects the sensor 40 with a power source 46. Power source may be a suitable battery which provides electrical power to the components of the camera apparatus 34. Also, in particular embodiments, a transmission conduit 47 extends from the sensor 40 to the surface 49 of the wellbore 10. At the surface 49, visual images obtained by the camera sensor 40 may be displayed or otherwise stored or processed in ways known in the art. The transmission conduit 47 may be an optic fiber cable or an electrical cable or the type used in tubewire. Alternatively, the transmission conduit 47 might comprise a wireless communication method, such as radio frequency communication or fluid pulse communications.

In alternative embodiments, the camera apparatus 34 is configured to capture infrared or thermal images. Also, although FIG. 2 depicts the lens 38 of the camera apparatus 34 as being directed axially downwardly into the wellbore 10, the lens might also be directed radially so that the camera apparatus 34 is a side-looking device. It is noted also that there may be more than one lens 38 and sensor 40 which will permit more than one image or set of images to be captured during a trip into the wellbore 10.

In certain embodiments, the camera housing 36 includes lights 48 which provide illumination of the surrounding wellbore 10 which allows the camera apparatus 34 to capture images more clearly. Lights 48 are preferably light-emitting diodes (LEDs) and are powered by the power source 46.

Figure 3:
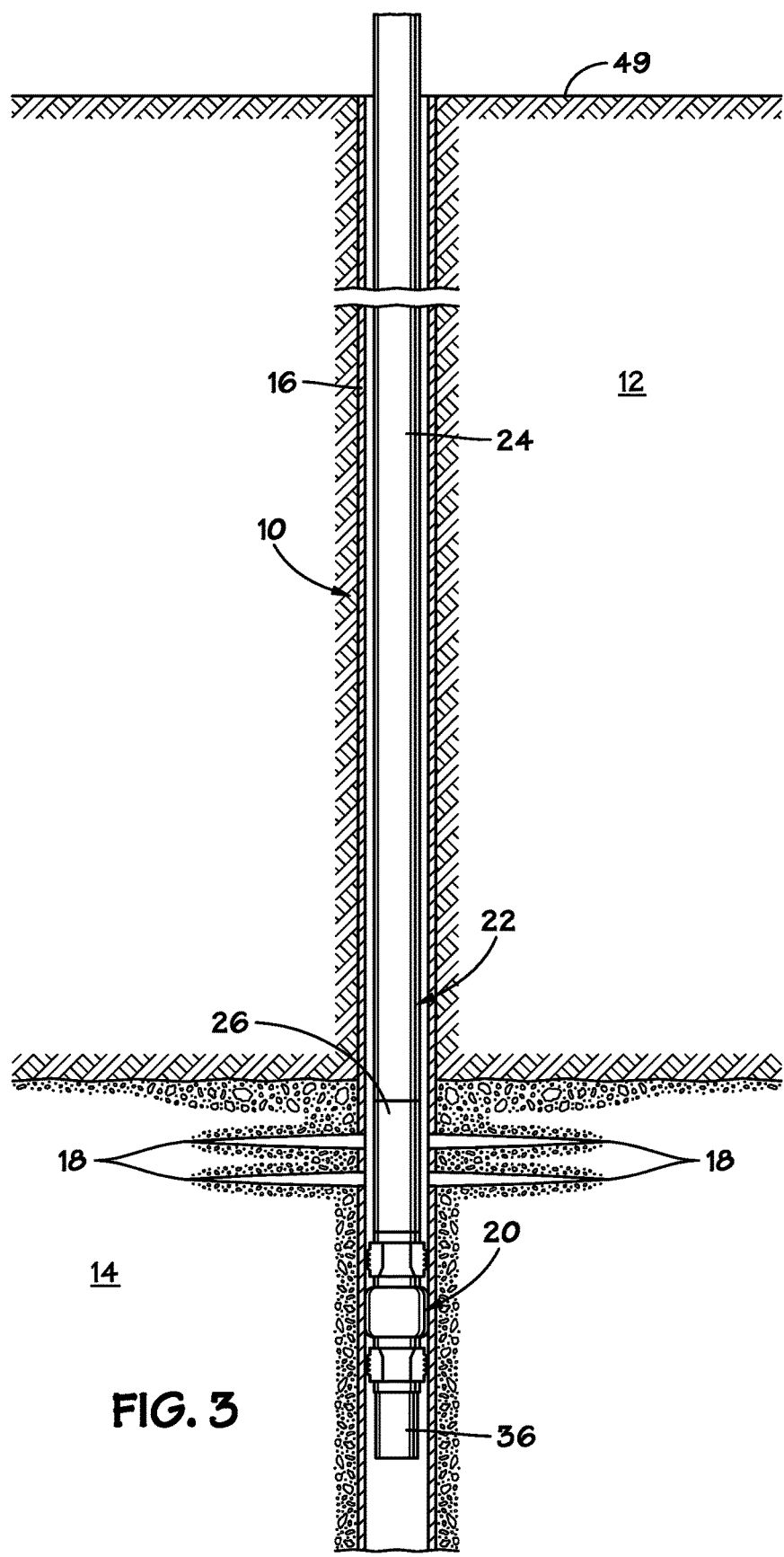
FIG. 3 is a side, cross-sectional view of the wellbore shown in FIG. 1, now with the plug having been set, and the setting tool being removed.
Figure 4:
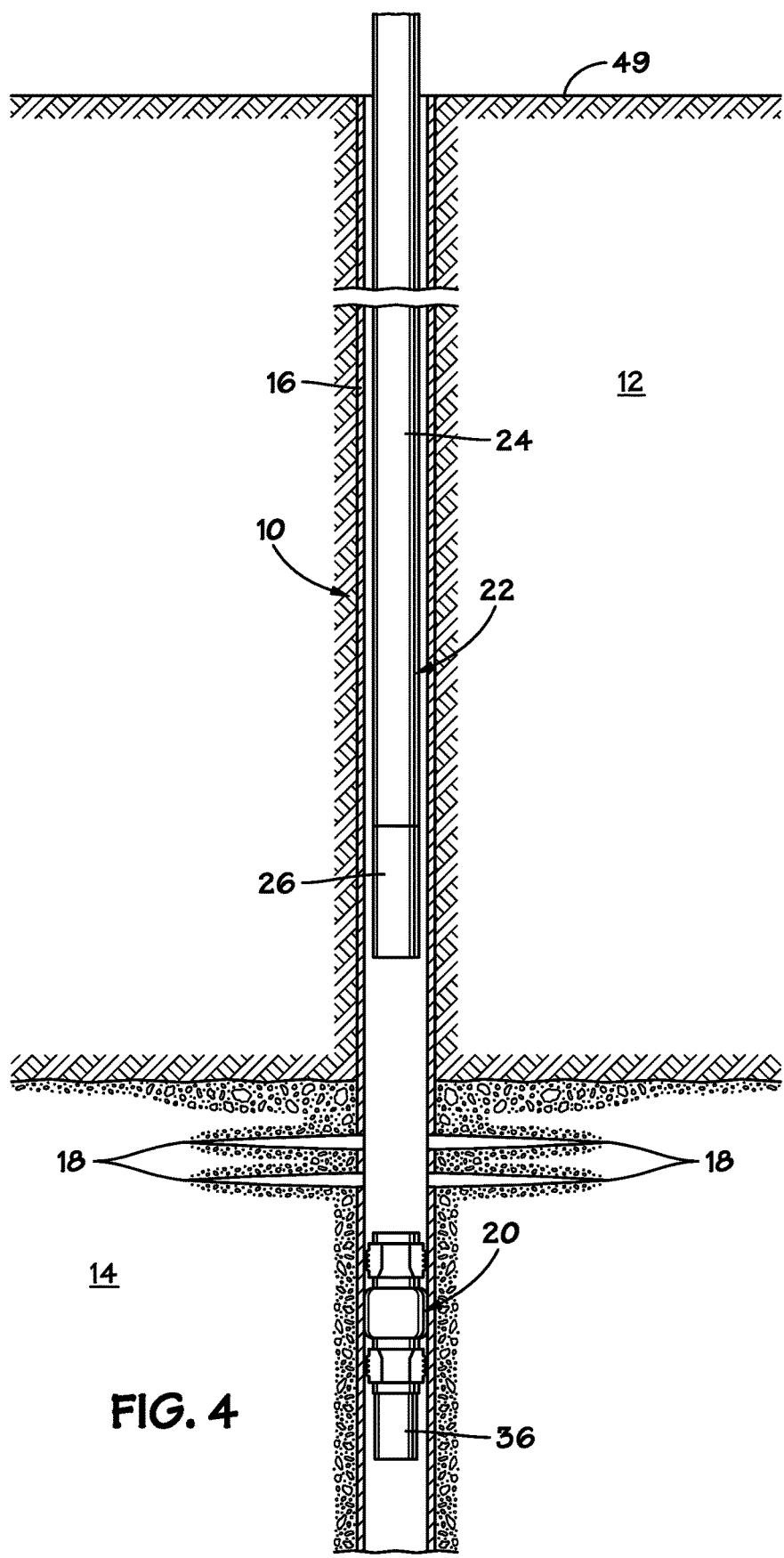
FIG. 4 is a side, cross-sectional view of the wellbore shown in FIGS. 1 and 3, now with the running arrangement being removed.

In operation, the frac plug 20 with camera apparatus 34 are disposed into the wellbore 10 in the direction of arrow 28 in FIG. 1 by running arrangement 22 until the frac plug 20 located at or near a depth or location within the wellbore 10 wherein it is desired to set the frac plug 20. Prior to running-in, the camera apparatus 34 is actuated. During running-in, the camera apparatus 34 is operated to obtain one or more visual images of the surrounding casing 16. When the frac plug 20 is located at or near the desired depth or location, the frac plug 20 is set against the surrounding casing 16 by the setting tool 26, as depicted in FIG. 3. The setting tool 26 is detached from the frac plug 20, also severing the communications cable 42. Thereafter, the running arrangement 22 is withdrawn from the wellbore 10. The camera housing 36 as well as the camera lens 38 and sensor 40 of the camera apparatus 34 will remain in the wellbore 10 along with the frac plug 20. However, the storage memory 44 and power source 46 are removed from the wellbore 10 along with the setting tool 26.

At surface, a user may access the storage memory 44 so that the visual images obtained by the camera apparatus 34 can be displayed, analyzed and so forth. The one or more images obtained by the camera apparatus 34 can help to identify problems or issues with the wellbore casing 16 or other possible problems with the wellbore 10. Fracturing operations can be conducted in the wellbore 10 behind or above the frac plug 20. If it is desired to remove the frac plug 20 at a later time, the frac plug 20 can be drilled out, also destroying the disposable camera housing 36, lens 38 and sensor 40.

It should be appreciated that the invention provides a camera apparatus that is associated with or at least partially incorporated into a downhole tool that performs a function in a subterranean location. In particular embodiments, the camera apparatus is associated with or at least partially incorporated into a downhole tool to perform a function within a wellbore. Exemplary downhole tools include production nipples, perforating guns, valves, packers and the like which are designed to perform one or more tasks within a wellbore.

In certain described embodiments, a camera apparatus 34 is partially incorporated into an emplaceable wellbore device, such as a plug, lock or packer device that is designed to be run to a subterranean location and left at the subterranean location. In a particular embodiment, the emplaceable wellbore device is a frac plug 20 that is set within a wellbore by a setting tool. The camera apparatus 34 is also partially incorporated into a separable running arrangement 22 that is used to run the frac plug 20 to a desired location and set it.

It should also be understood that the invention provides methods for obtaining one or more visual images of a subterranean location. In accordance with exemplary methods, camera apparatus 34 is operably associated with a down hole tool, such as frac plug 20, to be disposed at or near the subterranean location. The camera apparatus 34 includes a camera sensor 40 that can capture one or more visual images and a storage memory 44 to receive and store the one or more visual images. In accordance with exemplary methods, the downhole tool is disposed to a desired subterranean location. One or more visual images are recorded with the camera apparatus either during or after the time that the downhole tool and camera apparatus are disposed to the desired subterranean location.

In accordance with certain inventive methods, the storage memory 44 of the camera apparatus 34 is incorporated into the running arrangement 22 while the sensor 40 is incorporated into the downhole tool (i.e., frac plug 20). Further, the running arrangement 22 is separated from the downhole tool and is removed along with the storage memory 44. The storage memory 44 is retrieved at surface so that the one or more visual images stored within can be viewed.

FIG. 5 illustrates an alternative downhole device camera arrangement wherein a removable camera apparatus 34' is incorporated into frac plug 20 and associated setting tool 26. The camera assembly 34' includes a camera sensor 40 and lens 38 as well as a storage memory 44 and power source 46. In the illustrated embodiment, the lens 38 and sensor 40 are located at or distally beyond the distal end 50 of the plug 20. The storage memory 44 and power source 46 may be located within the setting tool 26, as shown, or otherwise proximally of the frac plug 20. The storage memory 44 and power source 46 are operably interconnected with the camera sensor 40 and lens 38 by communication wiring 52. A structural member, such as a section of rigid tubing, 54 preferably surrounds the wiring 52 and extends between the lens/sensor 38/40 and the memory/power source 46.

When the frac plug 20 is set within a wellbore 10, as illustrated in FIG. 6, the setting tool 26 is detached from the frac plug 20 and withdrawn in the direction of arrow 56. The camera lens 38 and sensor 40 along with wiring 52 and structural tubing 54 are removed along with the setting tool 26.

According to particular aspects, the devices and methods of the present invention provide camera apparatuses that are at least partially incorporated into a downhole device or tool and which can be completely or partially removed along with the running arrangement after the downhole device has been set or otherwise disposed within a subterranean location. In described embodiments, the camera apparatuses include a camera sensor 40 that is located at or beyond the distal end of the downhole device. Also in described embodiments, some or all of the camera apparatus is removable along with a running arrangement.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention.

What is claimed is:

1. A camera apparatus at least partially incorporated within a downhole tool to be disposed to a subterranean location by a running arrangement, the camera apparatus comprising:
    a camera sensor for capturing one or more visual images of a subterranean location;
    a storage memory within the running arrangement and operably associated with camera sensor, the camera sensor providing one or more visual images to the storage memory;
    a separable communications cable which operably interconnects the storage memory with the camera sensor so that the storage memory can be removed from the subterranean location while leaving the camera sensor in the subterranean location.

2. The camera apparatus of claim 1 wherein the downhole tool comprises an emplaceable wellbore device.

3. The camera apparatus of claim 2 wherein:
    the running arrangement includes a setting tool for setting the emplaceable wellbore device within a wellbore; and
    the storage memory is incorporated into the setting tool.

4. The camera apparatus of claim 1 further comprising a power source that is operably associated with the sensor and storage memory.

5. The camera apparatus of claim 3 further comprising communication wiring which extends between the storage memory and the camera sensor.

6. The camera apparatus of claim 1 further comprising a light for illuminating surroundings for the camera apparatus.

7. The camera apparatus of claim 1 wherein the camera sensor is mounted within a camera housing that is secured to a lower end of the downhole tool.

8. A camera apparatus incorporated within a downhole tool and a running arrangement for disposing the downhole tool to a subterranean location, the camera apparatus comprising:
    a camera sensor for capturing one or more visual images of a subterranean location, the camera sensor being incorporated into or fixedly secured to the downhole tool;
    a storage memory to receive and store one or more visual images from the camera sensor, the storage memory being incorporated into the running arrangement;
    a separable communications cable which operably interconnects the storage memory with the camera sensor so that the storage memory can be removed from the subterranean location while leaving the camera sensor in the subterranean location.

9. The camera apparatus of claim 8 further comprising a transmission conduit operably associated with the camera sensor to transmit the one or more visual images to surface.

10. The camera apparatus of claim 8 wherein the downhole tool comprises an emplaceable wellbore device.

11. The camera apparatus of claim 10 wherein:
    the running arrangement includes a setting tool for setting the emplaceable wellbore device within a wellbore; and
    a storage memory is incorporated into the setting tool.

12. The camera apparatus of claim 8 further comprising a power source that is operably associated with the sensor and storage memory.

13. The camera apparatus of claim 8 further comprising a light for illuminating surroundings for the camera apparatus.

14. The camera apparatus of claim 8 wherein the camera sensor is mounted within a camera housing that is secured to a lower end of the down hole tool.

15. A method for obtaining one or more visual images of a subterranean location comprising the steps of:
    operably associating a camera apparatus with a downhole tool to be disposed proximate the subterranean location, the camera apparatus having a camera sensor for capturing one or more visual images and a storage memory for storing the one or more images, the storage memory being retained within a running arrangement for disposing the downhole tool proximate the subterranean location;
    disposing the downhole tool and camera apparatus to a desired subterranean location;
    recording one or more visual images with the camera apparatus either during or after the time that the downhole tool and camera apparatus are disposed to the desired subterranean location;
    separating the running arrangement from the downhole tool; and
    removing the running arrangement and storage memory from the subterranean location while leaving camera sensor at the subterranean location.

16. The method of claim 15 further comprising the step of retrieving the storage memory at surface to view the one or more visual images.

* * * * *